(12) United States Patent
Winser

(10) Patent No.: US 7,100,112 B1
(45) Date of Patent: Aug. 29, 2006

(54) DYNAMIC PROPERTIES OF DOCUMENTS AND THE USE OF THESE PROPERTIES

(75) Inventor: Michael E. D. Winser, Westport, CT (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/315,334

(22) Filed: May 20, 1999

(51) Int. Cl.
*G06F 17/00* (2006.01)

(52) U.S. Cl. .................. 715/538; 715/513
(58) Field of Classification Search ........... 707/503; 715/513, 503, 523, 538
See application file for complete search history.

(56) References Cited

U.S. PATENT DOCUMENTS

| | | | | |
|---|---|---|---|---|
| 5,276,607 | A * | 1/1994 | Harris et al. | 345/467 |
| 5,835,712 | A * | 11/1998 | DuFresne | 709/203 |
| 5,926,822 | A * | 7/1999 | Garman | 707/503 |
| 6,138,130 | A * | 10/2000 | Adler et al. | 707/503 |

OTHER PUBLICATIONS

Dynamic HTML: Master the Essentials by Joseph Schmuller, © 1998, Chapter 7, found at http://library.books24x7.com/book/id_208/viewer.asp?pr=1.*

Vector Markup Language (VML), World Wide Web Consortium Note May 13, 1998, http://www.w3.org/TR/1998/NOTE-VML-19980513.*

Using <formulas>, Nov. 16, 1998 http://msdn.microsoft.com/library/default.asp?url=/workshop/author/VML/ref/adv10.asp.*

Wallent, "Be More Dynamic" originally published Jun. 11, 1998,<http://msdn.microsoft.com/library/default.asp?URL=/library/en-us/dndude/html/dude061198.asp>.*

<http://judyonline.org/school/dhtml/abstracts.html>.*

Belesis, Peter, "Background Image Resize (2)" May 7, 1998 http://www.webreference.com/dhtml/diner/bgresize/bgresize2.html.*

* cited by examiner

*Primary Examiner*—Stephen Hong
*Assistant Examiner*—Adam Queler
(74) *Attorney, Agent, or Firm*—Merchant & Gould P.C.

(57) ABSTRACT

A browser for executing HTML code received from a computer network having a computer. The browser comprises code programmed to analyze HTML code and identify scalar properties and expressions, each expression defining the value of a dynamic property and being a function of the scalar property; code programmed to map a dependent/dependency relationship between the expression and the scalar property; and code programmed to notice a change in a value of the scalar property and to execute the expression in response to the change in value of the scalar property.

9 Claims, 7 Drawing Sheets

DYNAMIC PROPERTIES OF DOCUMENTS AND THE USE OF THESE PROPERTIES

TECHNICAL FIELD

The present invention relates to dynamic properties within documents and the use of those dynamic properties by a software program. More particularly, the invention relates to dynamic properties within a document that are processed by a software program, and to the program's interpretation of the dynamic properties when processing the documents.

BACKGROUND

Referring to FIG. 1, a server 100 is in data communication with the Internet 102 and is configured to post Web pages that a computer user can access and view on a computer 104 at a remote location. The entire collection of web documents that are linked together and accessible through the Internet is called the World-Wide Web.

A Web page is typically created from an HTML document 106, which is a set of code in a text file format. The HTML document 106 controls the presentation and display of information on the computer 104. Examples of information that can be displayed on a Web page through the use of the HTML document 106 includes textual information, images, video, audio, and other executable programs.

The HTML document 106 includes properties that are used to control various attributes of the document including the format of its output. Properties define the characteristics or attributes of an object. Some uses for properties include setting the font for characters, the color for characters and background areas, and the position of objects within a viewing area. Additionally, many HTML documents 106 are programmed so that certain events will change the value for the properties. For example, the HTML document 106 might specify that the color and point size of text should change as the size of a window display area changes.

While the Internet 102 and the technology related to HTML documents 106 has revolutionized the way in which people access information, there are still shortcomings that limit who can develop these documents and post Web pages. For example, it is not possible to describe the relationships between objects, properties, and variables in terms of functions rather than specify explicit sequences of steps to follow. As a result, writing code that changes the value of properties based on certain events can be very complex and require knowledge of procedural programming and other complex programming techniques. Programming knowledge is thus a barrier to building a rich, dynamic, and self-adjusting HTML document for many people. Furthermore, the code that allows the value for properties to be modified can be long and tedious to write. Such complex code also places overhead on the processing power of the computer and can slow down the computer's ability to update and display a Web page.

SUMMARY

In general terms, the present invention addresses these problems by using executable expressions within documents that are processed by a software program. The expressions can define one property as a function of another property. Instead of having a static value, the value of properties are updated dynamically as the software program processing the document executes the expression.

One aspect of this invention relates to a computer-readable medium having computer-executable instructions for performing a method that uses expressions to establish a relationship between properties of a document that is executable by a browser running on a computer. Each property defines a characteristic of an object. The method comprises declaring the value of a first property as a scalar value; and declaring the value of a second property as an expression, wherein the second property is a function of the first property.

Another aspect of the invention relates to a computer-readable medium having stored thereon a data structure. The data structure includes a plurality of nodes and comprises at least one leaf node stored in memory. Each leaf node contains a scalar property. At least one expression node is stored in memory. Each expression node contains an expression defining a dynamic property of a document, the expression being a function of the scalar property. At least one pointer is stored in memory. Each pointer maps a dependent/dependency relationship between the scalar properties and the expressions, wherein upon notification of a change in the value for one of the scalar properties, a browser executes the expressions dependent on the scalar property having a changed value.

Another aspect of the invention is a method of using expressions to establish a relationship between properties of a document generated by HTML code that is executable by a browser. The properties include constant properties and dynamic properties. The method comprises declaring a value of one or more scalar properties, wherein the value of the scalar properties is not a function of another property; creating one or more expressions, each expression declaring a value of a dynamic property, each dynamic property being a function of another property; and generating a dependency graph, the dependency graph having a plurality of nodes, including at least one expression node and one leaf node, each expression node corresponding to an expression and each leaf node corresponding to a value of a scalar property, the dependency graph mapping the relationship between the properties.

Yet another aspect of the invention is directed to a computer for determining and outputting dynamic properties in HTML code that is received from a computer network. The computer comprises a processor. A peripheral device is in data communication with the processor. Memory is also in data communication with the processor. The memory stores a browser for execution by the processor. The browser includes code programmed to: (a) analyze the HTML code to identify scalar properties and expressions, each expression defining the value of a dynamic property and being a function of at least one scalar property; (b) map a dependent/dependency relationship between the expressions and the scalar properties, wherein each expression depends from at least one scalar property; and (c) upon notification of a change in value of the scalar property, execute each expression that depends on the scalar property having a changed value.

Still another aspect of the invention is a browser system for executing HTML code that is received from a remote computer that is in data communication with a network. The browser comprises code programmed to analyze HTML code and identify scalar properties and expressions, each expression defining the value of a dynamic property and being a function of the scalar property; code programmed to map a dependent/dependency relationship between the expression and the scalar property; and code programmed to notice a change in a value of the scalar property and to execute the expression in response to the change in value of the scalar property.

Yet another aspect of the invention includes an apparatus for determining and processing dynamic properties of a document in HTML code that is received at a client computing system. The client computing system is in a network that includes a server. The apparatus comprises an expression engine that identifies expressions and scalar properties received at the browser. Each expression for a document defines the value of a dynamic property and is a function of at least one scalar property. A recalc engine maps a dependent/dependency relationship between the expressions and the scalar properties, wherein each expression depends from at least one scalar property. The recalc engine, upon notification of a change in value of the scalar property, executes each expression that depends on the scalar property that has a changed value. A script engine is responsive to the recalc engine and generates a display in accordance with the dynamic property.

Still another aspect of the invention is a computer data signal embodied in a carrier wave that is readable by a computing system and encodes a computer program of instructions for executing a computer process using expressions. The expressions establish a relationship between properties of a document generated by HTML code that is executable by a browser. The properties include constant properties and dynamic properties. The computer process comprises providing a value of one or more scalar properties, wherein the value of the scalar properties is not a function of another property; creating one or more expressions, each expression declaring a value of a dynamic property, each dynamic property being a function of another property; and generating a dependency graph, the dependency graph having a plurality of nodes, including at least one expression node and one leaf node, each expression node corresponding to an expression and each leaf node corresponding to a value of a scalar property, the dependency graph mapping the relationship between the properties.

DETAILED DESCRIPTION

Figure 1:
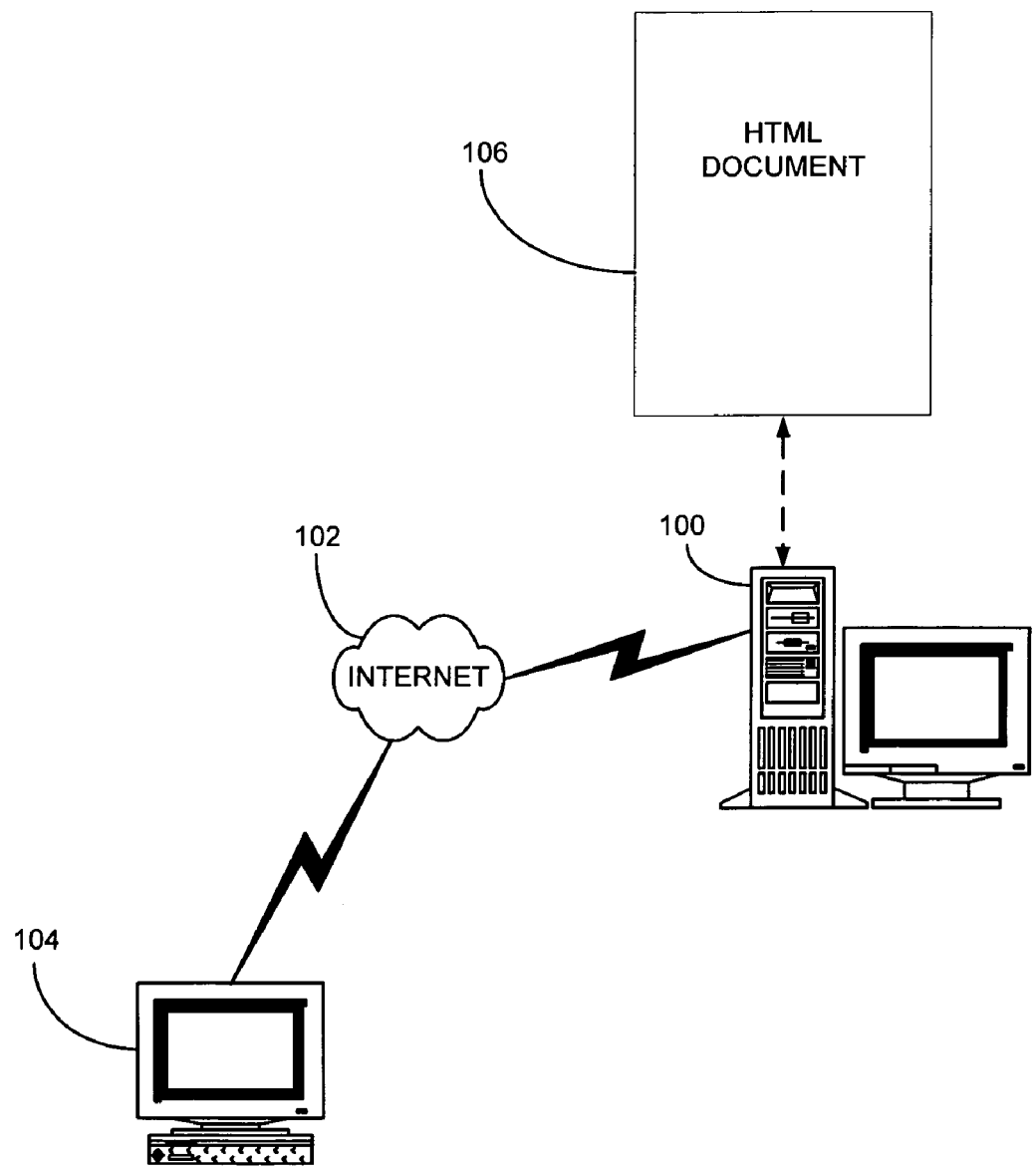
FIG. 1 illustrates one possible embodiment of a networking environment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto.

The following discussion is intended to provide a brief, general description of a suitable computing environment in which the invention may be implemented. Although not required, the invention will be described in the general context of computer-executable instructions being executed by a personal computer. Generally, programmed operations perform particular tasks or implement particular abstract data types.

Moreover, the invention may be practiced with other computer system configurations such as hand-held devices, multiprocessor systems, microprocessor-based or programmable consumer electronics, network PCs, minicomputers, and mainframe computers. The invention also may be practiced in distributed computing environments where tasks are performed by remote processing devices that are linked through a communications network. In a distributed computing environment, computer programs may be located in both local and remote memory storage devices.

Figure 2:
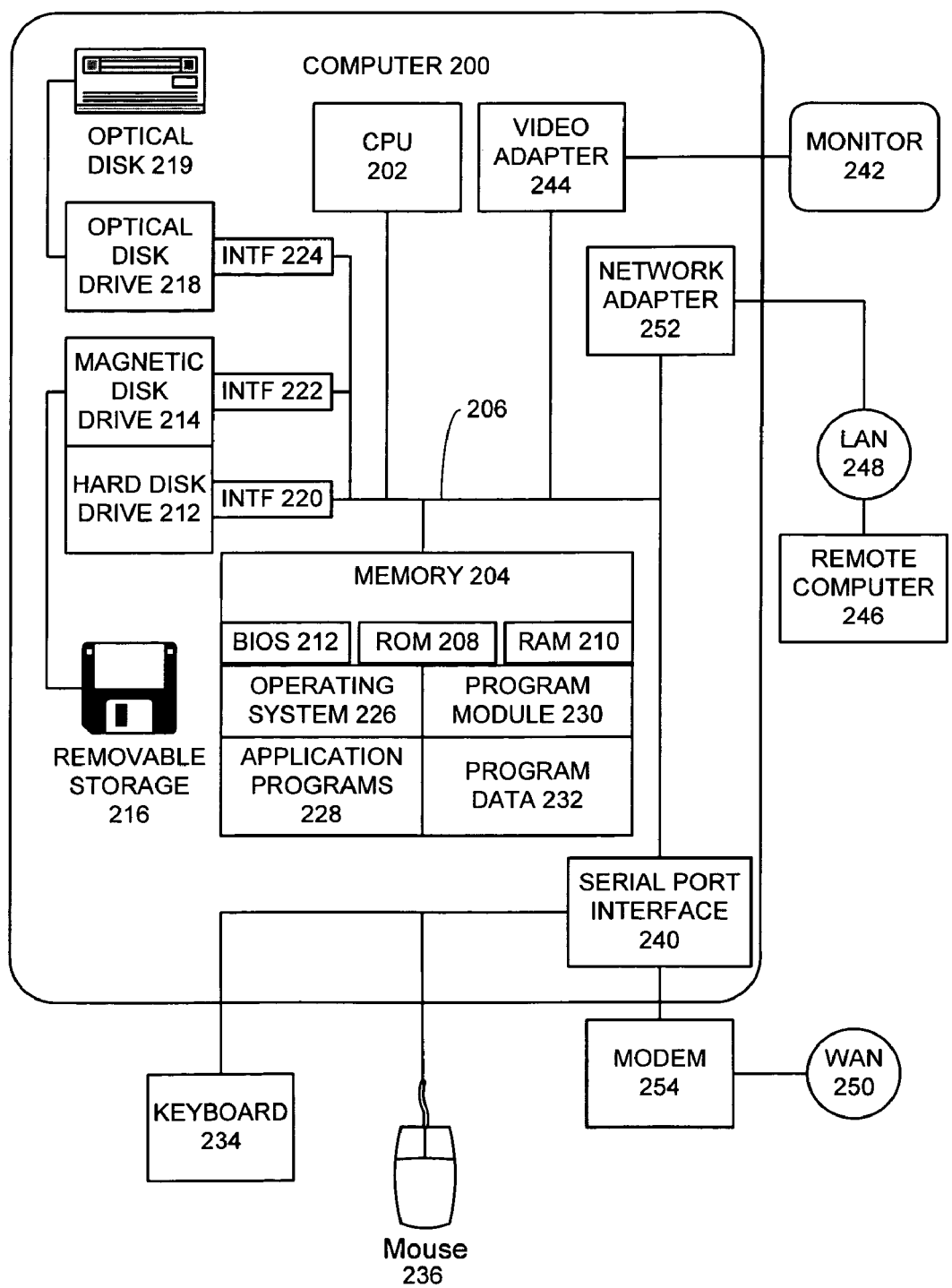
FIG. 2 illustrates one possible embodiment of a computer for running a browser and executing documents that include a dynamic property that is a function of another property.

With reference to FIG. 2, an exemplary system for implementing the invention includes a general purpose computing device in the form of a conventional personal computer 200, including a processor unit 202, a system memory 204, and a system bus 206 that couples various system components including the system memory 204 to the processor unit 200. The system bus 206 may be any of several types of bus structures including a memory bus or memory controller, a peripheral bus and a local bus using any of a variety of bus architectures. The system memory includes read only memory (ROM) 208 and random access memory (RAM) 210. A basic input/output system 212 (BIOS), which contains basic routines that help transfer information between elements within the personal computer 200, is stored in ROM 208.

The personal computer 200 further includes a hard disk drive 212 for reading from and writing to a hard disk, a magnetic disk drive 214 for reading from or writing to a removable magnetic disk 216, and an optical disk drive 218 for reading from or writing to a removable optical disk 219 such as a CD ROM, DVD, or other optical media. The hard disk drive 212, magnetic disk drive 214, and optical disk drive 218 are connected to the system bus 206 by a hard disk drive interface 220, a magnetic disk drive interface 222, and an optical drive interface 224, respectively. The drives and their associated computer-readable media provide nonvolatile storage of computer readable instructions, data structures, programs, and other data for the personal computer 200.

Although the exemplary environment described herein employs a hard disk, a removable magnetic disk 216, and a removable optical disk 219, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 216, optical disk 219, ROM 208 or RAM 210, including an operating system 226, one or more application programs 228, other program modules 230, and program data 232. A user may enter commands and information into the personal computer 200 through input devices such as a keyboard 234 and mouse 236 or other pointing device. Examples of other input devices may include a microphone, joystick, game pad, satellite dish, and scanner. These and other input devices are often connected to the processing unit 202 through a serial port interface 240 that is coupled to the system bus 206. Nevertheless, these input devices also may be connected by other interfaces, such as a parallel port, game port, or a universal serial bus (USB). A monitor 242 or other type of display device is also connected to the system bus 206 via an interface, such as a video adapter 244. In addition to the monitor 242, personal computers typically include other peripheral output devices (not shown), such as speakers and printers.

The personal computer 200 may operate in a networked environment using logical connections to one or more remote computers, such as a remote computer 246. The remote computer 246 may be another personal computer, a server, a router, a network PC, a peer device or other common network node, and typically includes many or all of the elements described above relative to the personal computer 200. The network connections include a local area network (LAN) 248 and a wide area network (WAN) 250. Such networking environments are commonplace in offices, enterprise-wide computer networks, intranets, and the Internet.

When used in a LAN networking environment, the personal computer 200 is connected to the local network 248 through a network interface or adapter 252. When used in a WAN networking environment, the personal computer 200 typically includes a modem 254 or other means for establishing communications over the wide area network 250, such as the Internet. The modem 254, which may be internal or external, is connected to the system bus 206 via the serial port interface 240. In a networked environment, program modules depicted relative to the personal computer 200, or portions thereof, may be stored in the remote memory storage device. It will be appreciated that the network connections shown are exemplary, and other means of establishing a communications link between the computers may be used.

Additionally, the embodiments described herein are implemented as logical operations or a sequence of steps running on the computer. These logical operations are implemented as interconnected machine modules within the computer. The implementation used is a matter of choice dependent on the performance requirements of the computer. Accordingly, the logical operations making up the embodiments of the invention described herein can be variously referred to as operations, steps, or modules.

Figure 3:
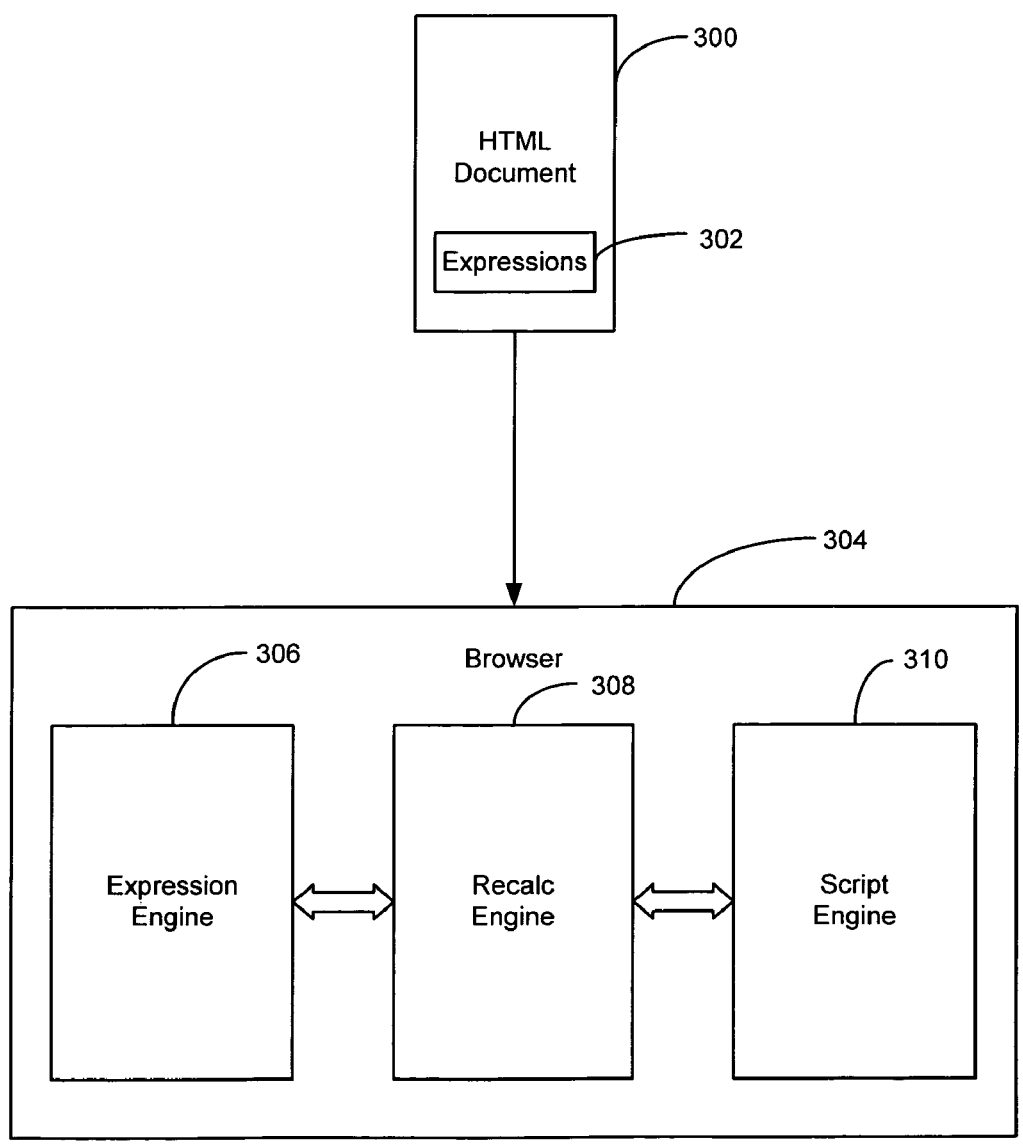
FIG. 3 illustrates one possible embodiment of a browser system working with an HTML document that includes expressions.

As shown in FIG. 3, one possible software program that is loaded on the computer is a browser 304, which is client software that enables a user to view an HTML document 300 posted on the World-Wide Web, another network, or on the user's computer. An exemplary version of the browser 304 is integrated with, and forms a part of, an operating system. An example of such a browser is version 5.0 of a browser named "INTERNET EXPLORER," which was developed by and is distributed by Microsoft Corporation of Redmond, Wash. An example of such an operating system is "WINDOWS 98," which was also developed by and distributed by Microsoft Corporation. Although an HTML document is described herein, other types of documents can embody expressions. A document is any collection of characters that is readable and executable by a computer.

The browser 304 can detect and process expressions 302 that are included in the HTML document 300. Expressions 302 enable a developer of a web page, or other appropriate document, to describe relationships between objects, properties, and variables in terms of functions, rather than specifying a sequence of steps. Accordingly, a developer can declare the values for dynamic properties as formulas, not only as constants. The variables that can be included in a formula used to define a dynamic property can include both other dynamic properties and scalar properties.

Expressions 302 can be declared either procedurally or in cascading style sheets (CSS). The use of CSS allows expressions to be defined in style sheets and cascaded to many matching elements. As a result, developers of HTML documents can declare elements, properties, and formulas as either CSS attributes or as HTML properties.

The following example illustrates one possible syntax that can be used to form expressions 302 in HTML.

Example

MyElement.setExpression("innerHTML", "document.body.clientWidth")

In this example, the string innerHTML is the identifier that names a variable or dynamic property. The string document.body.clientWidth is a dependency of the expression. This expression declares innerHTML as being a function of document.body.clientWidth. Accordingly, a change in the value of document.body.clientWidth will affect a change in the value of innerHTML.

The next example illustrates another possible syntax that can be used to form expressions. In this example, an expression sets the width of an element (e.g., the string "Expressions are cool . . . ") to one fourth the width of the parent. The height of the element is established by the browser. Another expression causes the element to disappear when its height is too large to fit within the display area of the browser.

Example

<html>

<body >

<div style="background: orange; position: absolute;
  left: 0;
  top: 0;
  width: expression(parentElement.clientWidth / 4); visibility: expression(offsetHeight > parentElement.clientHeight ? 'hidden' : 'inherit');

">

Expressions are cool. They let a web page developer declaratively specify computed values for CSS properties instead of writing script. This example shows how to combine sizing and visibility. The width of this element is ¼ of the display area of the browser. The height is left up to the layout engine. This element disappears when the height is too large to fit in the display area of the browser.

</div>

Although these examples are in HTML, expressions can be used with any language that is executable by an interpreter such as a browser. Examples include any appropriate markup language, which is a set of code created and stored in a text file, such as SGML. For scripting, a dynamic property and expression can be expressed as any legal scripting statement that is compatible with the browser 304. Examples of scripting languages that can be used include "JSCRIPT" and "VISUAL BASIC" script, which were developed by and are distributed by Microsoft. "JAVASCRIPT" is another example of a scripting language that can be used.

One possible embodiment of the browser 304 includes discrete sets or modules of code that form an expression engine 306, a recalc engine 308, and a scripting engine 310. The expression engine 306 reviews syntax of the HTML document 300 that the browser 304 is executing and identifies expressions 302 and scalar properties that are set forth in that document. It then passes this information to the recalc engine 308 for processing. The recalc engine 308 processes the expressions 302, builds a dependency graph, performs the calculations to determine the values for variable properties, and assigns the values to the variable properties. Using these values for the properties, the scripting engine 310 actually executes the document code, including the expressions, and generates and output for the computer 200. This output can have many different forms, including text and graphics that are displayed on the monitor 242.

Operation of the expression engine 306, recalc engine 308, and scripting engine 310 are described below in more detail. Additionally, although these engines are described as being discrete sets of code, they could be integrated into one set of code, into different sets of code, or integrated throughout the code that forms the browser 304.

Figure 4:
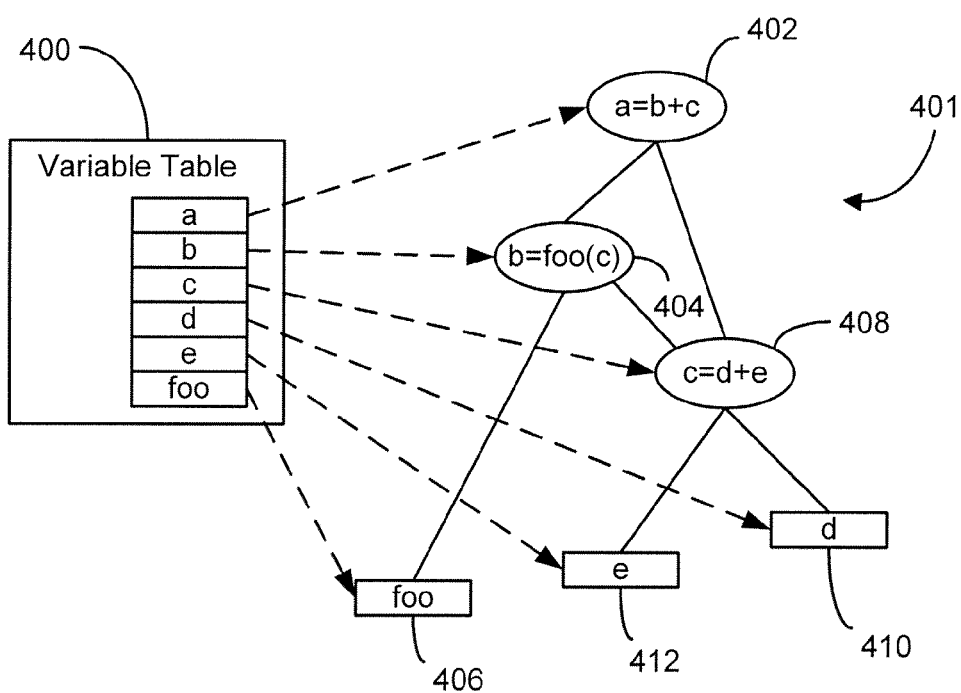
FIG. 4 illustrates a dependency graph that maps the relationship between expressions and properties that are included in the HTML document illustrated in FIG. 3.

Referring to FIG. 4, the recalc engine 308 creates a hierarchical tree or dependency graph 401 that maps the relationship between expressions. The dependency graph 401 provides a framework for determining the order in which expressions are evaluated and executed. The dependency graph 401 includes expression nodes and leaf nodes. In the illustrated example, the dependency graph 401 includes a plurality of expression nodes a, b, and c 402, 404, and 408, respectively. Leaf nodes include foo, d, and e 406, 410, and 412, respectively.

Each expression node 402, 404, and 408 represents an expression and is dynamic. Additionally, each expression node has one or more children on which it depends. The child of an expression node can be another expression node or a leaf node. Each leaf node is scalar because it assigns a scalar value to a scalar property. Leaf nodes do not have any children or dependencies. An example of a property that might correspond to a leaf node is the width of the window display area.

The dependency graph 401 forms a network of dependencies between the nodes. For example, the leaf node e 410 corresponds to a scalar property e, and the expression node c 408 corresponds to the variable or dynamic property c. Expression node c 408 depends on the leaf node e 410 and is its dependent node. Similarly, the leaf node e 410 is a dependency of the expression node c 408. Because the dependency is direct, expression node c 408 is a least-dependent node.

Similarly, the expression node a 402 does not have any dependents and is at the end of a network of dependencies. Accordingly, the expression node a 402 is a most-dependent expression node. Any nodes that are direct dependencies of the expression node a 402 are next-most dependent nodes. In the example illustrated in FIG. 3, therefore, the expression node c 408 is both a least-dependent node and a next-most dependent node.

The recalc engine 308 also creates a variable table 400, which is a lookup table of object/dispid pairs. In one possible embodiment, the lookup table is formed from a hash table of IDispatch objects. Each object entry is a list of dispid entries that correspond to a particular variable and point to the actual nodes in the dependency graph 401. The variable table 400 provides quick mapping between a variable and a node in the dependency graph 401. The variable table 400 also sets up and receives event notifications, which allows the object to listen for or notice events that affect a change in a property value. One possible mechanism for setting up and receiving event notifications is the OLE interface, IPropertyNotifySink.

Figure 5:
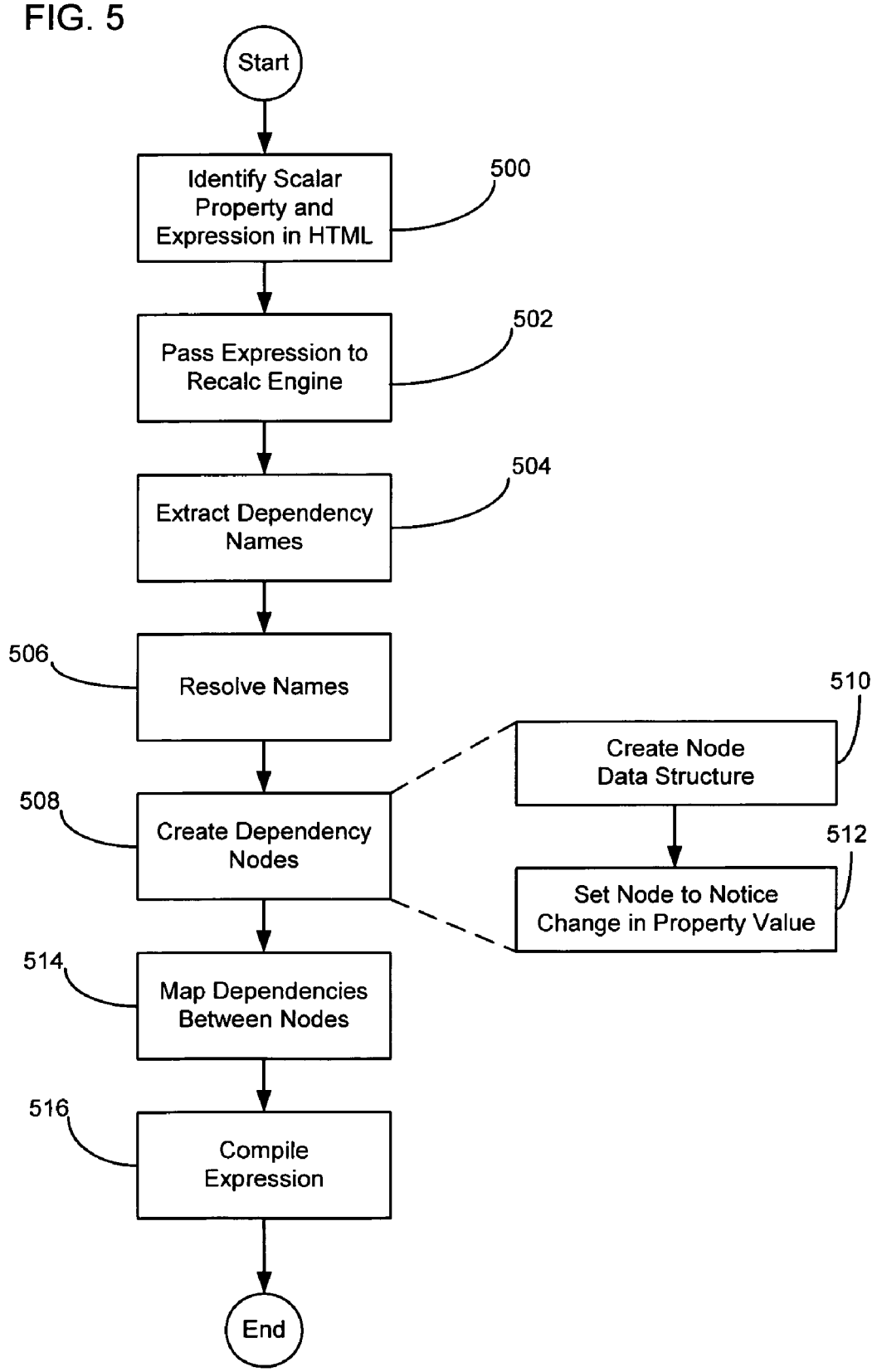
FIGS. 5–7 illustrates logical operation flow charts for the browser shown in FIG. 3.

FIG. 5 describes operation of the browser when creating a dependency graph. As an HTML document 300 is downloaded from the computer network, the browser 304 parses it and operation 500 of the expression engine 306 examines the syntax of the code to identify expressions 302 and scalar properties. Upon identifying an expression, operation 502 of the recalc engine 308 passes the character string that forms the expression syntax to the recalc engine 308.

Operation 504 then uses syntax coloring to analyze the character string and extract the names of dependencies. During syntax coloring, the recalc engine 308 sends a request to the scripting engine 310 asking for the appropriate syntax coloring scheme. The scripting engine 310 returns to the recalc engine 308 the color values that it should use. The recalc engine 308 then identifies each character and assigns a color to it.

By identifying the characters that correlate to the start of a new color and the characters that correlate to the end of a new color, the recalc engine 308 determines which sets of characters form a keyword and which set of characters form an identifier. The recalc engine 308 uses this information to identify the names in an expression that form the dependency. The recalc engine also uses this information to build the variable table 400.

Operation 506 of the recalc engine 308 resolves the names to actual properties. Resolution of the names is performed by generating pointers that map the dependency names to the actual properties that are calculated by the expressions 302. This mapping creates objects that are executable by the scripting engine 310.

Operation 508 of the recalc engine 308 creates a node for each expression after its names are resolved. Operation 510 creates a data structure that forms the nodes by setting aside a set of registers in memory that stores the text string version of the expression; a compiled or executable version of the expression; a flag that indicates whether the node is in a dirty state; and information about dependencies, including a list of the nodes that are dependent on it and nodes that depend from it. Additionally, operation 512 sets the variables in the variable table 400 and receives notifications about changes in an object that will affect a change in its value.

After the nodes are created, operation 514 of the recalc engine 308 records the dependencies between the nodes by creating pointers that map one node to the other nodes from which it depends. This mapping is accomplished by matching the name of the dependency in an expression with the name of the variable property recorded in other nodes. In one possible embodiment, mapping is performed after creation of all the nodes. In another possible embodiment, the mapping is created on the fly as matching nodes are created.

In addition to the above, the text string version of the expression is sent to the script engine 310, which generates an executable version of the expression. The executable version of the expression is returned to the recalc engine 308, where it is stored in the corresponding node.

Figure 6:
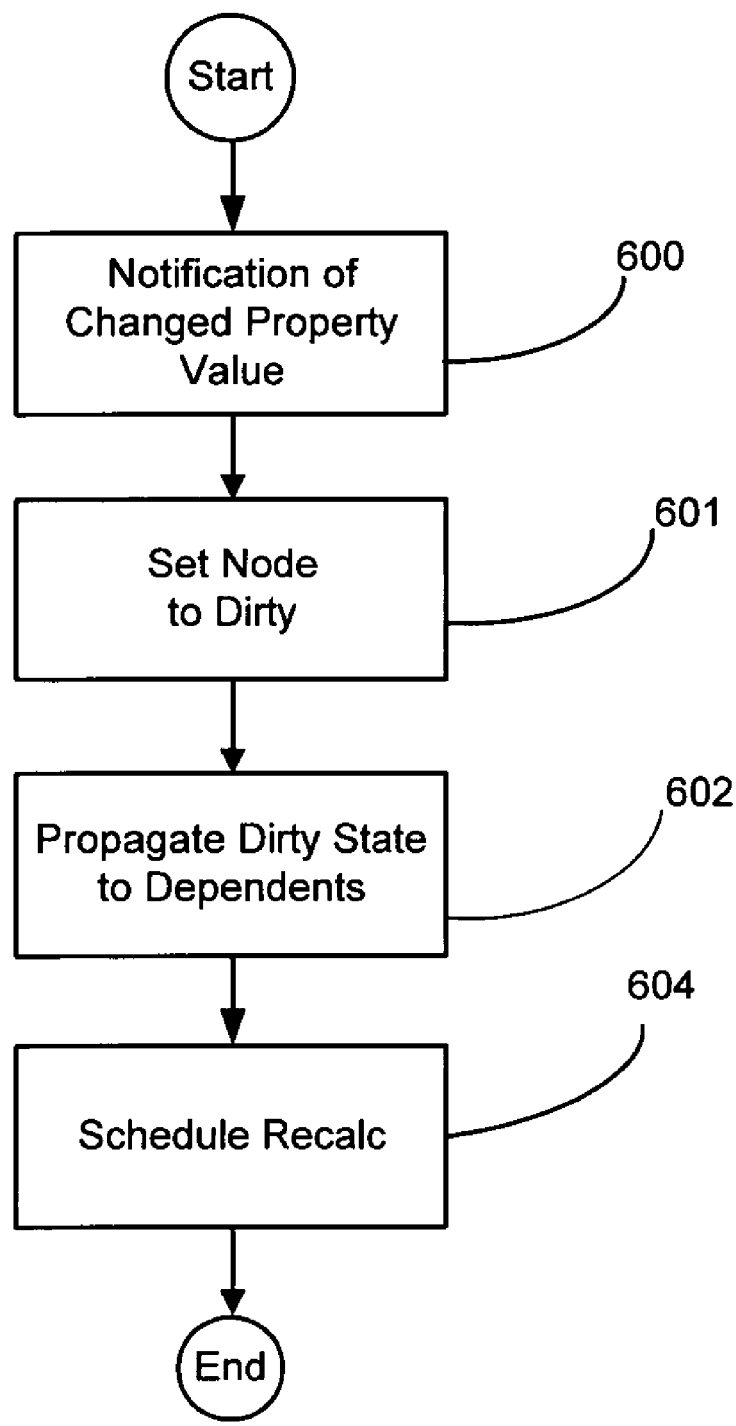

Referring now to operation 600 in FIG. 6, during execution of the HTML document 300, notification is received about changes in an object that will effect the value of the variable or property. In response, operation 601 changes the state of the corresponding node from clean to dirty. Operation 602 of the recalc engine 308 then propagates the dirty state to the other nodes that depend from the dirty node. This propagation continues upward in the dependency graph 401 until the most-dependent node, and hence expression, is marked as dirty. Because of the upward propagation, when a node has more than one dependency, one of the dependencies might be marked as dirty while the other dependencies remain in a clean state. This dirty state, together with the mapping between the nodes, is used by the recalc engine 308 to determine which expression should be executed and in what order the expressions are executed.

After the most-dependent node is changed to a dirty state, the expression engine 306 automatically schedules a recalc at operation 604. The recalc can be scheduled to occur either synchronously or asynchronously. If the recalculation is scheduled to occur synchronously, the recalc engine 308 automatically executes the values for the variable properties upon changing the most-dependent node to a dirty state. If the recalculation is scheduled to occur asynchronously, the recalc engine 308 independently executes a recalc after certain conditions are met or certain events occur. In asynchronous recalculation, for example, the expression engine 306 does not schedule a recalculation until there are no additional scalar properties changing and all of the dependent nodes are marked as dirty. This condition saves computational overhead when the values for several scalar properties are changing at the same time.

Figure 7:
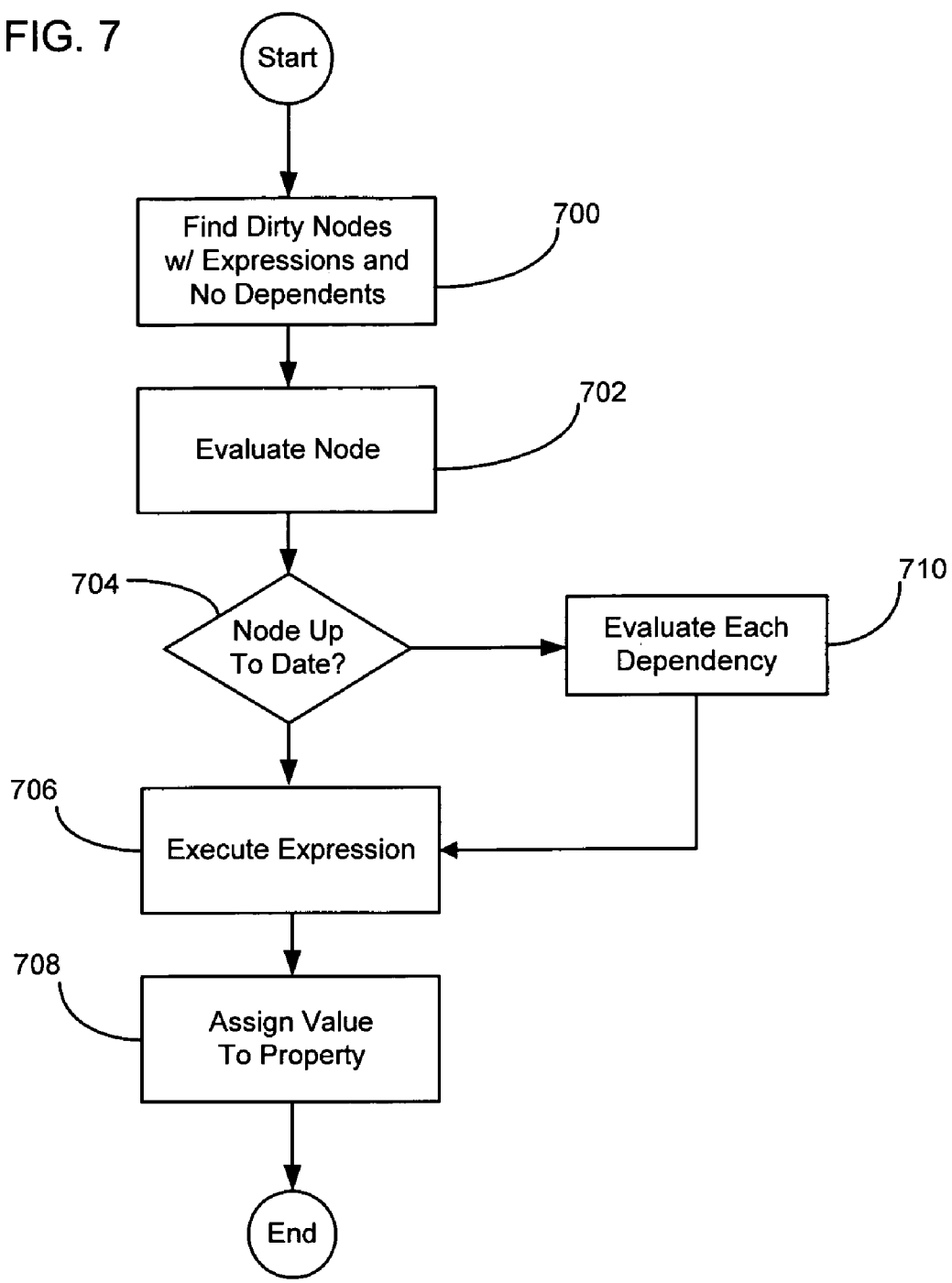

Referring now to FIG. 7, the expression engine 306 automatically instructs the recalc engine 308 to perform the recalculation at the appropriate time or after the appropriate conditions are met. In some situations, however, the developer of the HTML document 300 might need to manually instruct the recalc engine 308 to recalculate the expressions 302. An example of such a situation is when expressions 302 refer to global properties or variables. Recalc (true) is an example of a function that manually instructs the recalc engine 308 to execute all of the expressions 302 in the HTML document 300.

After the recalc engine 308 receives the recalc instruction, operation 700 examines all of the nodes in the dependency graph 401 to identify those that are both dirty and do not have any dependent nodes (i.e., most-dependent). This examination begins with the leaf nodes and works its way through the dependency graph 401. Nodes marked as clean are skipped.

After the most-dependent nodes are identified, operations 702 and 704 of the recalc engine 308 evaluates each of these nodes and determines whether their immediate dependencies (i.e., the next-most-dependent nodes) are up to date or have current values. If there are more than one most-dependent or starting nodes, they can be traversed in any order. Operation 702 evaluates these dependencies by examining whether the dependency nodes are marked as dirty or clean.

When all of the dependencies for the most-dependent nodes are up to date, operation 706 of the recalc engine 308 executes the expression to calculate the new value for the variable property. The recalc engine 308 then assigns the new value to the variable property and marks the node as clean.

For each of dependency of the most-significant node that is not up to date, the recalc engine 308 repeats the evaluation operation for that node to determine whether its dependencies are, in turn, up to date. If the dependencies for this next-most dependent node are up to date, the recalc engine 308 executes the formula set forth in the expression and assigns the recalculated value to the variable property for that node. The state of the next-most-dependent node is then marked as clean. The recalc engine 308 repeats these operations for each of the dirty nodes working its way through the dependency graph 401 to the leaf nodes.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of using expressions to establish a relationship between properties of a document generated by HTML code that is executable by a browser, the properties including constant properties and dynamic properties, the method comprising:

declaring a value of one or more scalar properties, wherein the value of the scalar properties is not a function of another property, and wherein at least one of the scalar properties is a width of a window of the browser;

creating one or more expressions declaring a value of a dynamic property, the dynamic property being a function of another property, the expression for programming formatting instructions, and wherein the expression represents an element in the window of the browser; and generating a dependency graph, the dependency graph having a plurality of nodes, including at least one expression node and one leaf node, the at least one expression node corresponding to an expression and the at least one leaf node corresponding to a value of a scalar property, the dependency graph mapping the relationship between the properties.

2. The method of claim 1 wherein the nodes have a dependent/dependency relationship to one another and each node has either a dirty state or a clean state, the method further comprising:

when the value for one of the properties changes, changing the state of the node corresponding to the changed property to dirty;

propagating the dirty state to each of the nodes in the dependency graph that are dependent on the node corresponding to the changed property; and recalculating the values of the expressions stored the nodes having a dirty state.

3. The method of claim 2 wherein recalculating the values of the expressions is performed automatically after completion of propagating the dirty state to each of the nodes in the dependency graph.

4. The method of claim 3 wherein:

the dependency graph includes a plurality of expression nodes mapped in network wherein the most-dependent expression node in the network has no dependent expression nodes and the least-dependent expression node depends directly on a scalar property; and recalculating the values of expressions stored in nodes having a dirty state includes (a) executing the expression corresponding to each of the expression nodes in the network beginning with the least-dependent node and ending with the most-dependent node, and (b) assigning the value of each executed expression to the dynamic property corresponding to that executed expression.

5. The method of claim 4 wherein the HTML code generates a user interface upon execution and at the property declared by the expression corresponding to the child node defines as least a portion of the user interface, the method further comprising updating the user interface upon assigning the value to the property declared by the expression corresponding to the child node.

6. A computer for determining and outputting dynamic properties in HTML code received from a computer network, the computer comprising: a processor: a peripheral in data communication with the processor; memory in data communication with the processor, the memory storing a browser for execution by the processor, the browser including code programmed to:
  (a) analyze the HTML code to identify scalar properties and expressions, at least one of the expressions defining the value of a dynamic property and being a function of at least one scalar property, wherein the scalar property is a width of a window of the browser, and wherein the expression represents an element in the window of the browser;
  (b) map a dependent/dependency relationship between the at least one of the expressions and the scalar properties, wherein each expression depends from at least one scalar property; and wherein the scalar properties and the expressions are mapped into a dependency graph; and
  (c) the browser is further programmed to assign a dirty state to each scalar property upon notification of a change in the scalar property's value, and propagate the dirty state from the scalar property to each expression that is dependent on the dirty scalar property and;
  (d) execute the at least one of the expressions that depends on the scalar property having a changed value wherein the browser code programmed to execute each expression is further programmed to execute only those expressions having a dirty state.

7. The computer of claim 6 wherein the browser code programmed to execute each expression is further programmed to execute each expression in the dependency graph in sequential order from a least-dependent expression to a most-dependent expression, the least-dependent expression depending directly on a scalar property and the most-dependent expression having no dependent expressions.

8. The computer of claim 6 wherein the computer further includes an input for receiving a signal, and the browser further includes code programmed to notice when a signal received by the input changes the value of a scalar property, and in response thereto automatically execute each expression that depends on the scalar property having a value changed by the input signal.

9. The computer of claim 6 wherein the peripheral is a computer monitor and the browser is further includes code programmed to display an HTML document having dynamic properties on the computer monitor.

* * * * *